United States Patent
Mantese et al.

(10) Patent No.: US 10,837,681 B2
(45) Date of Patent: Nov. 17, 2020

(54) ELECTROCALORIC HEAT TRANSFER SYSTEM

(71) Applicant: UNITED TECHNOLOGIES CORPORATION, Farmington, CT (US)

(72) Inventors: Joseph V. Mantese, Ellington, CT (US); Zhongfen Ding, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 177 days.

(21) Appl. No.: 15/752,862

(22) PCT Filed: Aug. 14, 2015

(86) PCT No.: PCT/US2015/045265
§ 371 (c)(1),
(2) Date: Feb. 14, 2018

(87) PCT Pub. No.: WO2017/030529
PCT Pub. Date: Feb. 23, 2017

(65) Prior Publication Data
US 2018/0238594 A1    Aug. 23, 2018

(51) Int. Cl.
*F25B 21/00* (2006.01)
*C08F 20/30* (2006.01)
(Continued)

(52) U.S. Cl.
CPC .............. *F25B 21/00* (2013.01); *C08F 20/30* (2013.01); *C08F 20/34* (2013.01); *C08G 77/60* (2013.01);
(Continued)

(58) Field of Classification Search
CPC ..... F25B 21/00; F25B 2321/001; C08G 77/60
See application file for complete search history.

(56) References Cited

U.S. PATENT DOCUMENTS 4,757,688 A * 7/1988 Basiulis .................. F25B 21/00
                                                        165/272
6,877,325 B1    4/2005 Lawless
(Continued)

FOREIGN PATENT DOCUMENTS

CN    103827601 A    5/2014
CN    104448171 A    3/2015
(Continued)

OTHER PUBLICATIONS

Acree, Jr., William, et al., Phase Change Enthalpies and Entropies of Liquid Crystals; J. Phys. Chem. Ref. Data, vol. 35, No. 3, 2006.
(Continued)

*Primary Examiner* — Brian M King
(74) *Attorney, Agent, or Firm* — Cantor Colburn LLP

(57) ABSTRACT

A cooling system includes an electrocaloric element (12) having a liquid crystal elastomer or a liquid form liquid crystal retained in an elastomeric polymer matrix. A pair of electrodes (14.16) is disposed on opposite surfaces of the electrocaloric element. A first thermal flow path (18) is disposed between the electrocaloric element and a heat sink (17). A second thermal flow path (22) is disposed between the electrocaloric element and a heat source (20). The system also includes a controller (24) configured to control electrical current to the electrodes and to selectively direct transfer of heat energy from the electrocaloric element to the heat sink along the first thermal flow path or from the heat source to the electrocaloric element along the second thermal flow path.

15 Claims, 1 Drawing Sheet

(51) Int. Cl.
*C08F 20/34* (2006.01)
*C08G 77/60* (2006.01)
*C08G 63/685* (2006.01)
*C08G 63/695* (2006.01)
*C08G 65/26* (2006.01)

(52) U.S. Cl.
CPC ......... *C08G 63/685* (2013.01); *C08G 63/695* (2013.01); *C08G 65/2612* (2013.01); *F25B 2321/001* (2013.01); *Y02B 30/00* (2013.01)

(56) References Cited

U.S. PATENT DOCUMENTS

| | | | |
|---|---|---|---|
| 9,671,140 B2* | 6/2017 | Kruglick | F25B 21/00 |
| 2002/0048641 A1* | 4/2002 | Yamaguchi | B29B 9/04 428/35.7 |
| 2010/0037624 A1* | 2/2010 | Epstein | F25B 21/00 62/3.1 |
| 2010/0175392 A1 | 7/2010 | Malloy et al. | |
| 2015/0033762 A1 | 2/2015 | Cheng et al. | |
| 2016/0187034 A1* | 6/2016 | Malic | F25B 21/00 62/3.1 |
| 2017/0183456 A1* | 6/2017 | Resetic | C09K 19/544 |

FOREIGN PATENT DOCUMENTS

| | | |
|---|---|---|
| EP | 2851634 A1 | 3/2015 |
| JP | 04311724 A | 11/1992 |
| JP | 2013160460 A | 8/2013 |

OTHER PUBLICATIONS

International Search Resport regarding related PCT App. No. PCT/US2015/045265; dated Apr. 25, 2016; 6 pgs.
Qian, Xiao-Shi, et al., Large Electrocaloric Effect in a Dielectric Liquid Possessing a Large Dielectric Anisotropy Near the Isotropic-Nematic Transition; Advanced Functional Materials, 2013; 3 pgs.
Warner, M., et al., Liquid Crystal Elastomers, Clarendon Press, 2003; 16 pgs. Y:\UTC\U400003US\REFERENCE\7ZD9833.PDF.
Written Opinion regarding related PCT App. No. PCT/US2015/045265; dated Apr. 25, 2016; 5 pgs.
Japanese Office Action Issued in Japanese Patent Application No. 2018-507605 dated Jul. 9, 2019; 4 Pages.
Chinese Office Action Issued in Chinese Application No. 201580082494.5 dated Dec. 18, 2019; 8 Pages.

* cited by examiner

ELECTROCALORIC HEAT TRANSFER SYSTEM

CROSS-REFERENCE TO RELATED APPLICATIONS

This is a national stage of International Patent Application Serial No. PCT/US2015/045265, filed Aug. 14, 2015.

BACKGROUND OF THE INVENTION

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. These loops typically circulate a refrigerant having appropriate thermodynamic properties through a loop that comprises a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops.

BRIEF DESCRIPTION OF THE INVENTION

In some aspects of the invention, a heat transfer system comprises an electrocaloric element comprising a liquid crystal elastomer or a liquid form liquid crystal retained in an elastomeric polymer matrix. A pair of electrodes is disposed on opposite surfaces of the electrocaloric element. A first thermal flow path is disposed between the electrocaloric element and a heat sink. A second thermal flow path is disposed between the electrocaloric element and a heat source. The system also includes a controller configured to control electrical current to the electrodes and to selectively direct transfer of heat energy from the electrocaloric element to the heat sink along the first thermal flow path or from the heat source to the electrocaloric element along the second thermal flow path.

According to some aspects of the invention, a method of cooling a heat source comprises applying an electric field as a voltage differential across an electrocaloric element comprising a liquid crystal elastomer or a liquid crystal retained in an elastomeric polymer matrix. The applied electric field causes a decrease in entropy and a release of heat energy by the electrocaloric element. At least a portion of the released heat energy is transferred to a heat sink. The electric field is then removed, which causes an increase in entropy and a decrease in heat energy and absorption of heat energy by the electrocaloric element. Heat energy is transferred from the heat source to be absorbed by the electrocaloric element, resulting in cooling of the heat source.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
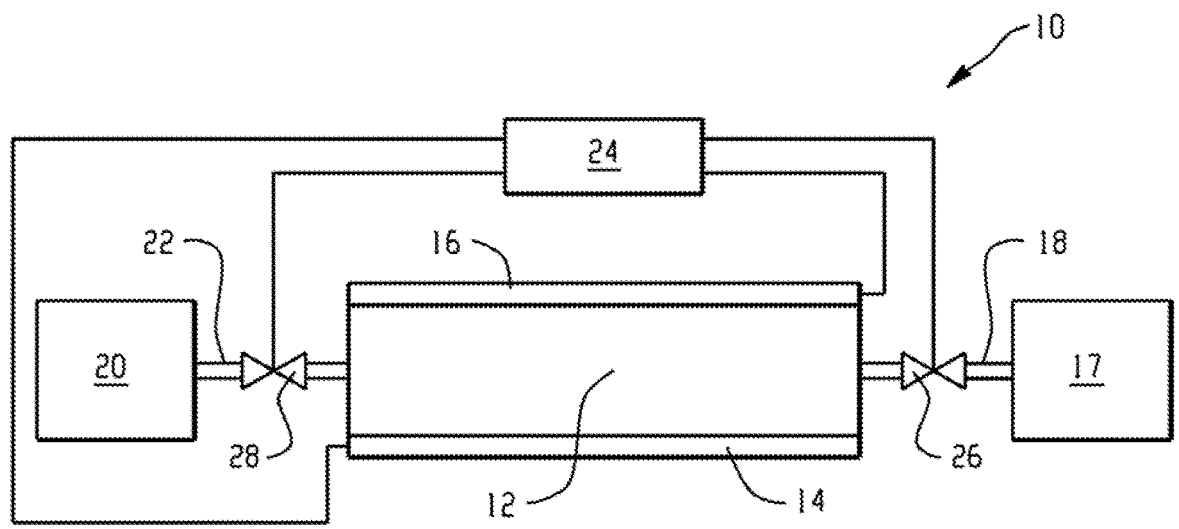
FIG. 1 is a schematic depiction of an exemplary cooling system as described herein.

With reference to the Figures. FIG. 1 depicts an exemplary cooling system 10. As shown in FIG. 1, a cooling system 10 includes an electrocaloric element 12 having electrodes 14 and 16 on opposite sides of the electrocaloric element 12. As further described below, the electrocaloric element 12 comprises a liquid crystal elastomer or a liquid form liquid crystal retained in an elastomeric polymer matrix. The assembly of the electrocaloric element 12 and the electrodes 14 and 16 can be prepared by applying an electrode-forming ink (such as metal nanoparticle slurries, metal microparticles slurries, metal/carbon nanowire dispersions, graphene dispersions) or other composition to the solid or the liquid crystal elastomer or elastomeric polymer matrix.

As used herein, the term "liquid crystal elastomer" means a matrix of polymer molecules comprising mesogenic groups that is elastically deformable by nematic or smectic ordering of the mesogenic groups in response to application of an external field. Liquid crystal elastomers are known in the art and are further described in "Liquid Crystal Elastomers", M. Warner and E. M. Terentjev, Oxford University Press 2007 (rev. ed.), the disclosure of which is incorporated herein by reference in its entirety, to the extent allowable by law. In some exemplary embodiments, the liquid crystal elastomer comprises a polymer liquid crystal that has been modified with a degree of crosslinking to impart an elastomeric response (i.e., elastic deformation and shape recovery of the polymer matrix) compared to the non-recoverable fluid deformation of a polymer liquid crystal. As used herein, the term "polymer liquid crystal" means a matrix of polymer molecules comprising mesogenic groups that is fluidly deformable by nematic or smectic ordering of the mesogenic groups in response to application of an external field. Polymer liquid crystals, or liquid crystal polymers, comprise polymer molecules that include mesogenic groups. Mesogenic molecular structures are well-known, and are often described as rod-like or disk-like molecular structures having electron density orientations that produce a dipole moment in response to an external field such as an external electric field. Liquid crystal polymers typically comprise numerous mesogenic groups connected by non-mesogenic molecular structures. The non-mesogenic connecting structures and their connection, placement and spacing in the polymer molecule along with mesogenic structures are important in providing the fluid deformable response to the external field. Typically, the connecting structures provide a stiffness that low enough so that a deformation response is induced by application of the external field, and high enough to provide the characteristics of a polymer when the external field is not applied.

In some exemplary embodiments, a liquid crystal polymer can have rod-like mesogenic structures in the polymer backbone separated by non-mesogenic spacer groups having flexibility to allow for re-ordering of the mesogenic groups in response to an external field. Such polymers are also known as main-chain liquid crystal polymers. In some exemplary embodiments, a liquid crystal polymer can have rod-like mesogenic structures attached as side groups attached to the polymer backbone. Such polymers are also known as side-chain liquid crystal polymers.

Examples of main-chain liquid crystal polymers include those having the repeating structures shown with $C_{10}$ and $C_8$ polyethylene spacer groups, respectively:

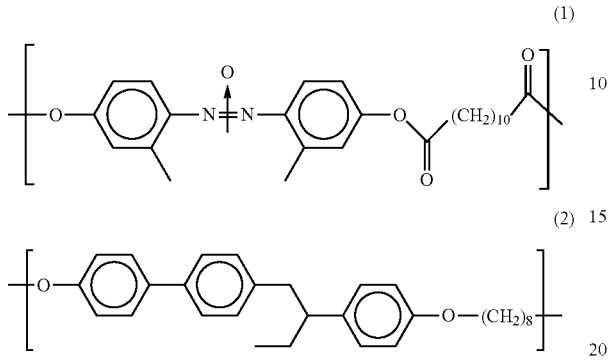

Examples of side-chain liquid crystal polymers include those having the repeating structures shown with $C_4$ and $C_{10}$ polyethylene spacer groups, respectively:

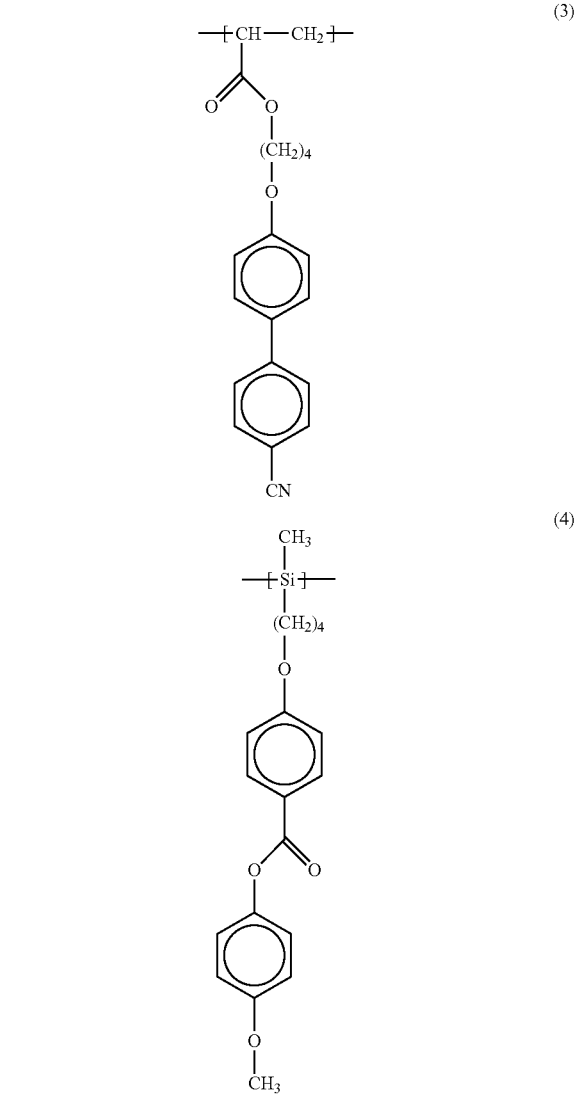

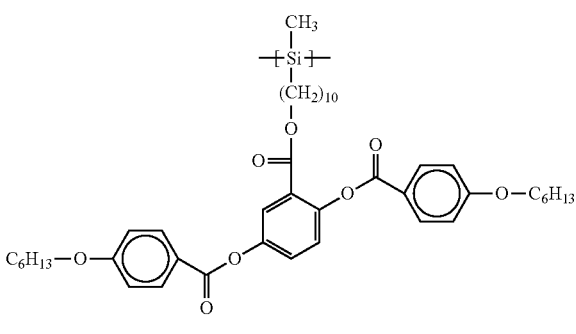

Of course, the above structures are exemplary. Many other liquid crystal polymers are known, and can be readily utilized by the skilled person.

As mentioned above, in some embodiments liquid crystal elastomers can be based on liquid crystal polymers that have been modified with crosslinking. The crosslink density can be adjusted to be low enough so that local molecular flexibility is retained to allow nematic or smectic ordering of the mesogenic groups in response to an external field. However, the crosslink density is set high enough to produce a macro elastic deformation response of the polymer to the external field instead of the Brownian molecular motion that results in a fluid, non-elastic macro response to the external field. The crosslinking reaction can rely on any type of crosslinking mechanism such as including tri- or higher-functional monomer in the monomer reactants during polymerization or by including functional side groups such as hydroxyl attached to the polymer chain, which can be reacted with a crosslinking agent such as a diisocyanate. The functional side groups can be selected to result in a mesogenic group integrated in the crosslink chain, or the mesogenic groups can be attached as side groups on the polymer chain separate from crosslink chains that are non-mesogenic. Many liquid crystal elastomers are known, and can be readily utilized by the skilled person.

As mentioned above, the electrocaloric element 12 can also comprise a liquid form liquid crystal retained in an elastomeric polymer matrix. Materials having liquid crystal retained in a polymer matrix are known in the art as polymer dispersed liquid crystal (PDLC), and can be prepared using various techniques including but not limited to polymerization-induced phase separation, thermal-induced phase separation, solvent-induced phase separation, to induce a phase separation resulting in a multiphase matrix having a polymer phase and a liquid crystal phase. The liquid crystal phase can include a molecular liquid crystal, a polymer liquid crystal, or an oligomer liquid crystal. A polymer dispersed liquid crystal with an elastomeric polymer matrix can be prepared using known separation techniques for preparing PDLC in combination with generally known techniques of monomer selection, crosslinking, and processing to prepare an elastomeric polymer as the PDLC polymer matrix.

Turning again to FIG. 1, the electrocaloric element 12 can be in thermal communication with a heat sink 17 through a first thermal flow path 18. The electrocaloric element 12 can also be in thermal communication with a heat source 20 through a second thermal flow path 22. A controller 24 is configured to control electrical current to the connected electrodes 14 and 16. The controller 24 is also configured to control heat flow control devices 26 and 28 to selectively direct the transfer of heat along the first and second heat flow paths 18 and 22. The type of heat flow path and heat flow control device is not limited and can include, for example, solid state heat thermoelectric switches in thermally conductive contact with the electrocaloric element and the heat source or heat sink, or thermomechanical switches in movable to establish thermally conductive contact between the electrocaloric element 12 and the heat source 20 or heat sink 17. In some exemplary embodiments, described in more detail below, heat transfer between the electrocaloric element 12 and the heat source 20 or heat sink 17 can include convective heat transfer to a flowing fluid in contact with the electrocaloric element 12. In such cases, the fluid, which should be dielectric to avoid electrochemical interaction with the electrocaloric element 12, can itself be the heat source (e.g., a conditioned airspace) or the heat sink (e.g., outside air), or the fluid can be a dielectric heat transfer fluid (e.g., an organic compound) flowing between the electrocaloric element 12 and a remote heat source 20 or heat sink 17.

In operation, the system 10 can be operated by the controller 24 applying an electric field as a voltage differential across the electrocaloric element 12 to cause a decrease in entropy and a release of heat energy by the electrocaloric element 12. The controller 24 activates the heat flow control device 26 to transfer at least a portion of the released heat energy along heat flow path 18 to heat sink 17. This transfer of heat can occur alter the temperature of the electrocaloric element 12 has risen to a threshold temperature. In some embodiments, it may be desirable to avoid excessive temperature increase in order to maintain polymer physical properties of the liquid crystal elastomer during this entropy reduction phase, and in some embodiments, heat transfer to the heat sink 17 is begun as soon as the temperature of the electrocaloric element 12 increases to be about equal to the temperature of the heat sink 17. After application of the electric field for a time to induce a desired release and transfer of heat energy from the electrocaloric element 12 to the heat sink 17, the electric field is removed. Removal of the electric field causes an increase in entropy and a decrease in heat energy of the electrocaloric element 12 as the elastomeric polymer matrix elastically returns to its original molecular alignment. This decrease in heat energy manifests as a reduction in temperature of the electrocaloric element 12 to a temperature below that of the heat source 20. The controller 24 deactivates heat flow control device 26 to terminate transfer of heat energy along heat flow path 18, and activates heat flow control device 28 to transfer heat energy from the heat source 20 to the colder electrocaloric element 12.

In some embodiments, for example where a heat transfer system is utilized to maintain a temperature in a conditioned space or thermal target, the electric field can be applied to the electrocaloric element 12 to increase its temperature until the temperature of the electrocaloric element reaches a first threshold. After the first temperature threshold, the controller 24 activates heat flow control device 26 to transfer heat from the electrocaloric element 12 to the heat sink 17 until a second temperature threshold is reached. The electric field can continue to be applied during all or a portion of the time period between the first and second temperature thresholds, and is then removed to reduce the temperature of the electrocaloric element 12 until a third temperature threshold is reached. The controller 24 then deactivates heat flow control device 26 to terminate heat flow transfer along heat flow path 18, and activates heat flow control device 28 to transfer heat from the heat source 20 to the electrocaloric element 12. The above steps can be optionally repeated until a target temperature of the conditioned space or thermal target (which can be either the heat source or the heat sink) is reached.

Figure 2:
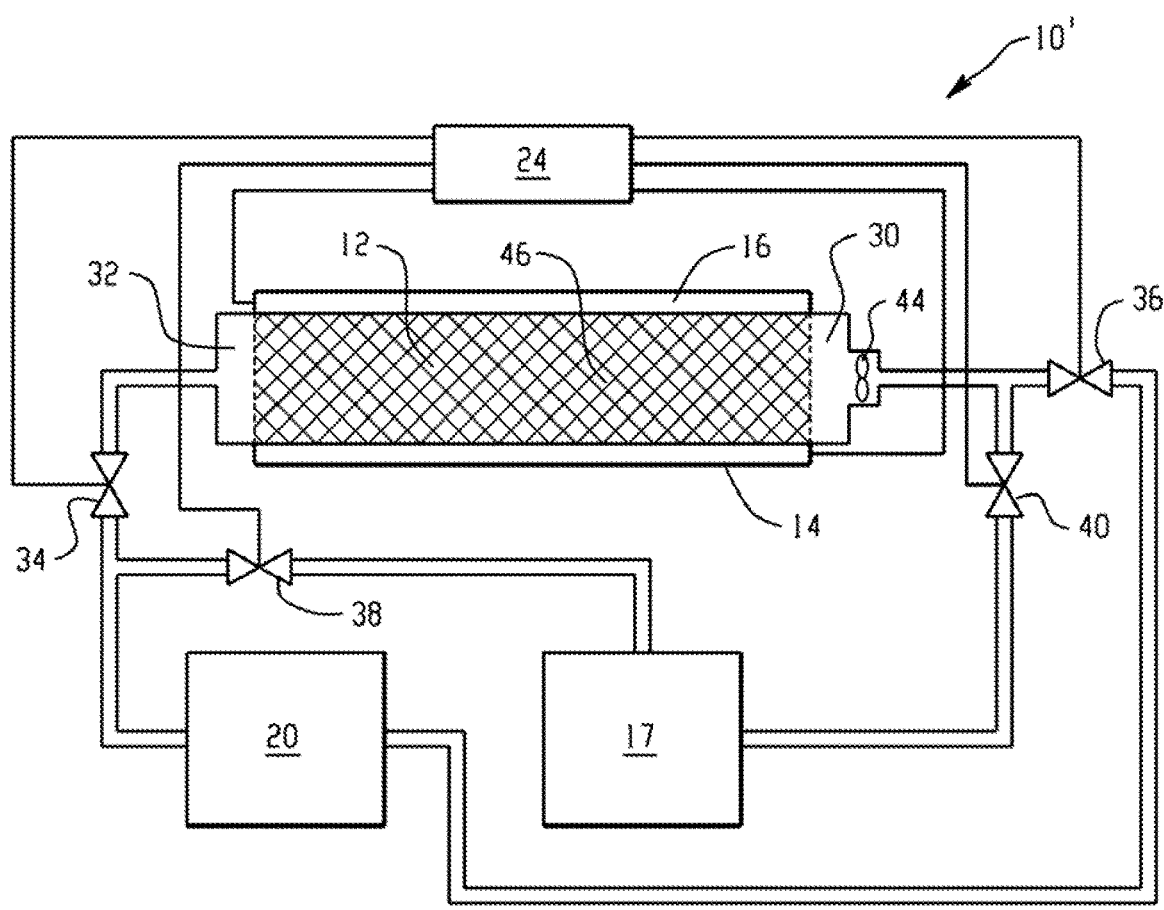
FIG. 2 is a schematic depiction of another exemplary cooling system as described herein.

As mentioned above, in some embodiments, the thermal flow paths can involve a dielectric fluid, either air or other dielectric gas or liquid such as an organic compound heat transfer fluid. In such embodiments, the dielectric fluid can itself be the heat source or heat sink (e.g., outside air), or the dielectric fluid can flow to and transfer heat with a remote heat sink or remote heat source. A technical effect of the use of a dielectric fluid is to facilitate application of electric field to the electrocaloric element with simultaneous transfer of heat from the electrocaloric element to the heat sink. Many prior art systems that rely on conductive heat transfer to or from an electrocaloric element must avoid transferring heat during operation of the electrocaloric element. A cooling system 10' for transferring heat from a heat source (e.g., cooling a conditioned air space) to a heat sink (e.g., an external air space outside of the conditioned air space) is schematically depicted in FIG. 2, which has like numbering for like parts as FIG. 1 that do not require further description below. FIG. 2 is generally configured and operated like FIG. 1, with heat transfer between the electrocaloric element 12 and the heat sink 17 or heat source 20 provided by a dielectric fluid flowing through conduits connecting header spaces 30 and 32 that interface with the electrocaloric element 12 to the heat sink 17 and heat source 20 through control valves 34, 36, 38, and 40. Additionally, the electrocaloric element has flow channels 46 (schematically represented by cross-hatching) for fluid flow through the electrocaloric element 12 between header spaces 30 and 32. It should be noted that although the fluid flow path through the electrocaloric element is depicted for convenience of illustration as horizontal, it could also be vertical (transverse to the electrocaloric element 12) with the channels extending through the electrodes or the electrodes being permeable to the dielectric fluid.

The operation of the system 10' is described below with respect to an air conditioning system where the heat source is a conditioned air space and the heat sink is outside air, but it is understood that the system can also be operated in heat pump mode, or with a heat transfer fluid that transfers heat to and from remote heat sources/sinks. In operation, the system 10' can be operated by the controller 24 applying an electric field as a voltage differential across the electrocaloric element 12 to cause a decrease in entropy and a release of heat energy by the electrocaloric element 12. The controller 24 opens control valves 38 and 40, closes control valves 34 and 36, and activates blower 44 to drive airflow from outside air source (heat sink) 17 through the electrocaloric element to transfer at least a portion of the released heat energy from the electrocaloric element 12. After application of the electric field for a time to induce a desired release and transfer of heat energy from the electrocaloric element 12, the electric field is removed. Removal of the electric field causes an increase in entropy and a decrease in heat energy of the electrocaloric element 12 as the elastomeric polymer matrix elastically returns to its original molecular alignment. This decrease in heat energy manifests as a reduction in temperature of the electrocaloric element 12 to a temperature below that of the conditioned space (heat source) 20. The controller 24 closes control valves 38 and 40 and opens control valves 34 and 36 to direct airflow from blower 44 between the electrocaloric element 12 and the conditioned space.

Liquid crystal elastomers and elastic polymer dispersed liquid crystals can be synthesized in bulk using conventional polymerization techniques to form membranes with a thickness ranging from micron meter to hundreds of micrometer to be used for the electrocaloric element 12. The liquid crystal domains are typically uniform in size. The liquid crystal elastomers can have mesogenic groups forming aligned nanocrystalline regions with the size of nanometers to a hundred nanometers when external electric was applied. The liquid crystals domains can be in the size of from a few nanometers (e.g., 3 nm) to a hundred nanometers in elastomer dispersed system. Different elastomer systems are available to disperse liquid crystals to form homogeneous spherical domains. The elastomer networks are typically mechanically stable over long time periods and have wide operation temperature range up to 200° C. Because of the low modulus of elasticity of elastomers, lower electric field strength is needed for the alignment of the mesogenic groups formed domains in these systems. Upon the removal of the electric field, the intrinsic interaction between the elastomer network and the mesogenic groups/liquid crystal molecules leads the nanostructure to relax and randomize. Compared to many prior art ferroelectric, thermoelectric, or electrocaloric systems that can be used on small scale for applications such as electronics cooling, but have had limited success in achieving scalability for use in high thermal load applications like refrigeration or residential, vehicular, or commercial heating or cooling applications, the systems describe herein have the potential to achieve high levels of performance by utilizing not only the conventional electrocaloric effect caused by the decrease in entropy from the nematic or smectic ordering of the mesogenic groups, but also an elastocaloric effect where field-induced nematic or smectic ordering of mesogenic structures induces an elastic deformation in the elastomer matrix (which can have a modulus of elasticity of from 1 MPa to 100 MPa), which results in further release of heat energy that is transferred to the heat sink and later recovered from the heat source after the field is removed. Additionally, unlike small molecule liquid crystals where ionic impurities can migrate to the electrodes and interfere with performance, the elastomeric electrocaloric elements described herein are tolerant of ionic impurities existing in the dispersed phase.

The elastocaloric effect can be achieved not only at the macro level, but also at the micro-domain level where different domains of liquid crystal, liquid crystal polymer liquid crystal elastomer, and/or conventional polymer or elastomer can be configured to interact under application of an external field to achieve significant entropy changes between field-applied and field-removed states. Liquid crystal elastomers can be in a single crystalline or monodomain configuration where there is alignment of the mesogenic structures in the polymer in the absence of an external field. This can be accomplished by applying an external field during polymerization and/or crosslinking to form the polymer matrix with mesogenic group structural alignment. Crystalline polymer alignment can also be produced by conventional polymerization materials and techniques. Multiple crystalline domain polymer matrixes can be used where different liquid crystal elastomer domains are oriented to produce desired effects such as having re-alignment caused by the external field to cause elastic strain along different orientations to minimize macro strain on the article. In some embodiments, a liquid crystal elastomer, liquid crystal oligomer, liquid crystal polymer, or a liquid crystal in liquid form can be in a multiphase polymer composition with a second polymer or elastomer (or more than one other polymer or elastomer) that does not have to have liquid crystal characteristics. In some embodiments, the second polymer is a continuous phase, and the liquid crystal elastomer, liquid crystal oligomer, liquid crystal polymer, or liquid crystal in liquid form is a discontinuous phase. In some embodiments, the second polymer is a discontinuous phase, and the liquid crystal elastomer or liquid crystal polymer is a continuous phase.

The systems described herein can be operated in a cooling mode where the heat source is a conditioned space or cooling target. The systems described herein can also be operated in a heat pump mode where the heat sink is a conditioned space or heating target. It should also be noted that the described systems are exemplary in nature and that modifications can of course be made. For example, a single controller 24 is in each Figure, but control could be provided by distributed control or smart components such as temperature-sensitive heat transfer control devices. Also, although the systems are depicted with a single electrocaloric element and electrode assembly, it is understood by the skilled person that connected banks or arrays of elements can be used as well.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat transfer system, comprising
   an electrocaloric element comprising a liquid crystal elastomer or a liquid form liquid crystal retained in an elastomeric polymer matrix;
   a pair of electrodes disposed on opposite surfaces of the electrocaloric element;
   a first thermal flow path between the electrocaloric element and a heat sink;
   a second thermal flow path between the electrocaloric element and a heat source; and
   a controller configured to control electrical current to the electrodes and to selectively direct transfer of heat energy from the electrocaloric element to the heat sink along the first thermal flow path or from the heat source to the electrocaloric element along the second thermal flow path, wherein the electrocaloric element comprises a multi-phase polymer composition comprising a first phase comprising the liquid crystal elastomer, and a second phase comprising a second polymer and the second phase is a continuous phase and the first phase is a discontinuous phase or the first phase is a continuous phase and the second phase is a discontinuous phase.

2. The system of claim 1, wherein the heat source and/or the heat sink comprises a conditioned dielectric fluid.

3. The system of claim 2, wherein the conditioned fluid is air.

4. The system of claim 2, wherein the electrocaloric element comprises a fluid flow path for the dielectric fluid in thermal communication with the electrocaloric element.

5. The system of claim 4, wherein the fluid flow path is a channel in the electrocaloric element.

6. The system of claim 4, further comprising means responsive to the controller for selectively directing a heat source conditioned dielectric fluid or a heat sink dielectric fluid along the fluid flow path.

7. The system of claim 1, wherein electrocaloric element comprises immobilized ionic impurities.

8. The system of claim 1, wherein the liquid crystal elastomer has a polymer backbone that comprises mesogenic groups.

9. The system of claim 1, wherein the liquid crystal elastomer has side chains that comprise mesogenic groups.

10. The system of claim 1, wherein the liquid crystal elastomer has a modulus of elasticity of from 1 MPa to 100 MPa in the system's operating temperature range.

11. The system of claim 1, wherein the liquid crystal elastomer has at least partial alignment of mesogenic groups in an orientation different from an orientation when electrical current is provided to the electrodes.

12. The system of claim 1, wherein the second polymer is elastomeric.

13. The system of claim 1, wherein the second polymer is not elastomeric.

14. A method of using the system of claim 1, comprising
applying an electric field as a voltage differential across the electrocaloric element, thereby causing a decrease in entropy and a release of heat energy by the electrocaloric element;
transferring at least a portion of the released heat energy to the heat sink;
removing the electric field, thereby causing an increase in entropy and a decrease in heat energy and absorption of heat energy by the electrocaloric element; and
transferring heat energy from the heat source to be absorbed by the electrocaloric element.

15. The method of claim 14, comprising
applying the electric field to the electrocaloric element to increase the temperature of the electrocaloric element until the temperature of the electrocaloric element reaches a first threshold;
transferring heat energy from the electrocaloric element to the heat sink to reduce the temperature of the electrocaloric element until the temperature of the electrocaloric element reaches a second threshold;
removing the electric field to reduce the temperature of the electrocaloric element until the temperature of the electrocaloric element reaches a third threshold;
transferring the heat energy from the heat source to cool the heat source and increase the temperature of the electrocaloric element until the temperature of the electrocaloric element reaches a fourth threshold; and optionally
repeating the above steps until a target temperature is reached for the heat source or heat sink.

* * * * *